(12) United States Patent
Roether et al.

(10) Patent No.: US 7,584,837 B2
(45) Date of Patent: Sep. 8, 2009

(54) CONVEYING DEVICE

(75) Inventors: Manfred Roether, Markdorf (DE); Franz Riedter, Waldburg (DE)

(73) Assignee: Arzneimittel GmbH Apotheker Vetter & Co. (DE)

( * ) Notice: Subject to any disclaimer, the term of this patent is extended or adjusted under 35 U.S.C. 154(b) by 424 days.

(21) Appl. No.: 10/552,972

(22) PCT Filed: Apr. 7, 2004

(86) PCT No.: PCT/EP2004/003696

§ 371 (c)(1),
(2), (4) Date: Nov. 16, 2005

(87) PCT Pub. No.: WO2004/089788

PCT Pub. Date: Oct. 21, 2004

(65) Prior Publication Data

US 2006/0201779 A1    Sep. 14, 2006

(30) Foreign Application Priority Data

Apr. 12, 2003   (DE)   ................... 103 16 941

(51) Int. Cl.
*B65G 17/00* (2006.01)
(52) U.S. Cl. ................. 198/717; 198/343.1; 198/343.2; 198/345.3; 198/465.1; 198/470.1; 198/802; 198/867.01; 198/345.1; 198/475.1

(58) Field of Classification Search ............. 198/343.1, 198/343.2, 345.1, 345.3, 465.1, 470.1, 475.1, 198/717, 802, 867.01
See application file for complete search history.

(56) References Cited

U.S. PATENT DOCUMENTS

| | | | | |
|---|---|---|---|---|
| 4,562,919 A | * | 1/1986 | Cattani | 198/345.2 |
| 4,567,822 A | * | 2/1986 | Heidenreich et al. | 101/38.1 |
| 4,712,670 A | | 12/1987 | Burkhardt | 198/803.01 |
| 5,377,815 A | * | 1/1995 | Vetter et al. | 198/476.1 |
| 5,465,826 A | * | 11/1995 | Noestheden | 198/465.3 |
| 5,529,168 A | | 6/1996 | Soriano et al. | 198/465.1 |

(Continued)

FOREIGN PATENT DOCUMENTS

DE    1 256 153    12/1967

(Continued)

OTHER PUBLICATIONS

English translated International Preliminary Report On Patentability, mailing date Mar. 9, 2006; and attached PCT Notification of Transmittal of Copies of Translation of the International Preliminary Report on Patentability (Chapter I or Chapter II of the Patent Corporation Treaty). Total pp. 7.

(Continued)

*Primary Examiner*—Gene Crawford
*Assistant Examiner*—Leslie A Nicholson, III
(74) *Attorney, Agent, or Firm*—Ostrolenk, Faber, Gerb & Soffen, LLP

(57) ABSTRACT

A transport device having a preferably flat transport element and at least one basic carrier which is mounted on the basic carrier by rollers. At least one article carrier can be mounted. The transport element is driven stops along the transport element allow halting of at least some of the basic carrier.

20 Claims, 2 Drawing Sheets

U.S. PATENT DOCUMENTS

| | | | |
|---|---|---|---|
| 5,901,949 A * | 5/1999 | Muranaka et al. | 270/58.23 |
| 6,019,214 A | 2/2000 | Herronen et al. | 198/465.1 |
| 6,371,273 B1 | 4/2002 | Bredenfeld | 198/345.3 |

FOREIGN PATENT DOCUMENTS

| | | |
|---|---|---|
| DE | 7308019 | 12/1972 |
| DE | 26 27 264 | 12/1976 |
| DE | 35 05 640 A1 | 8/1986 |
| DE | 39 26 755 A1 | 2/1991 |
| DE | 94 10 390 U1 | 3/1996 |
| DE | 297 09 547 U1 | 9/1997 |
| DE | 102 01 841 A1 | 7/2003 |
| EP | 0 734 976 B1 | 10/1996 |
| JP | 63-57414 | 8/1986 |

OTHER PUBLICATIONS

International Search Report PCT/EP2004/003696 dated Jul. 22, 2004.
Office Action in Japanese counterpart application 2006-505037, Examiner's Notice Date of Dec. 1, 2008, English translation only, two pages.

* cited by examiner

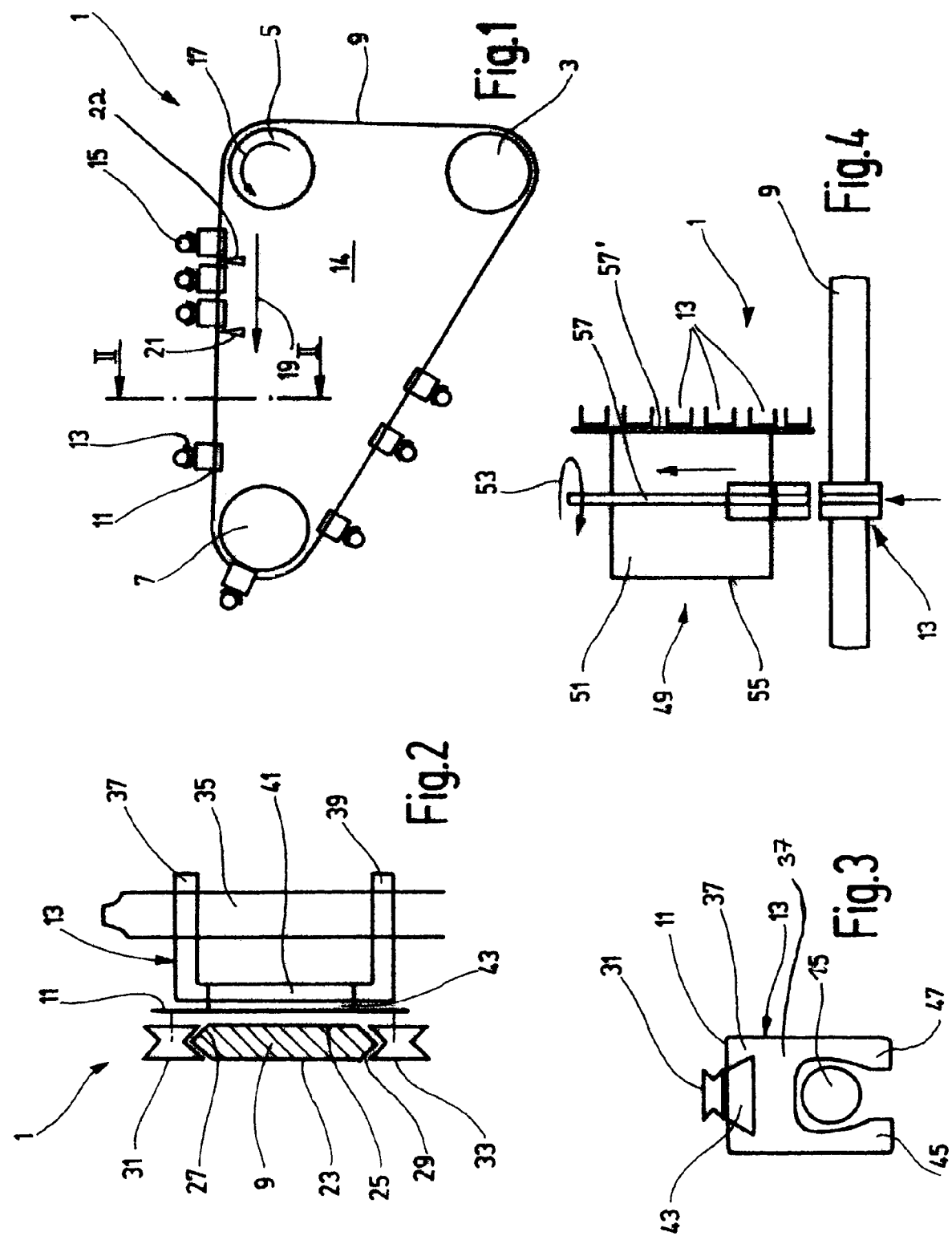

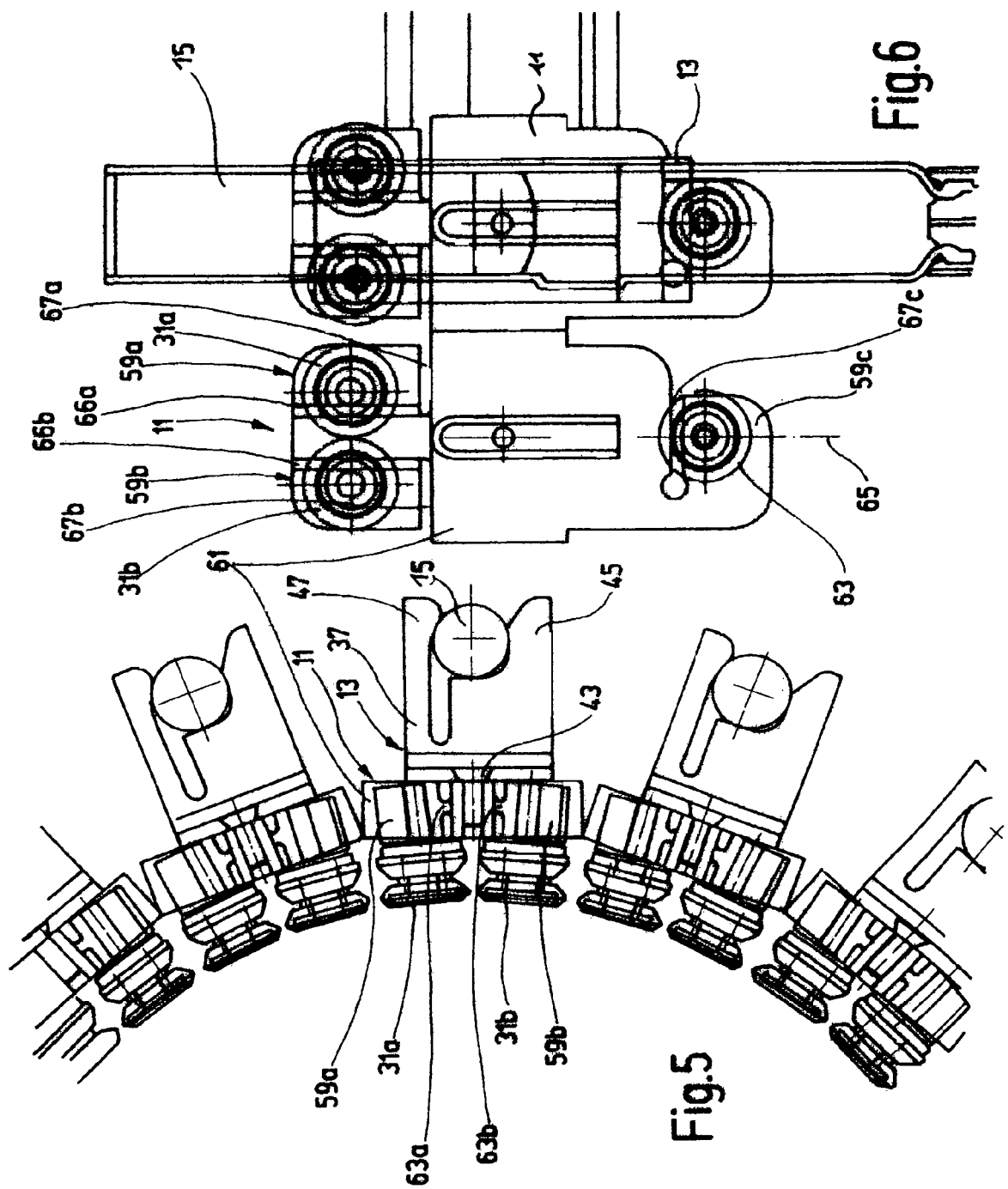

CONVEYING DEVICE

CROSS REFERENCE TO RELATED APPLICATION

The present application is a 35 U.S.C. §§ 371 national phase conversion of PCT/EP2004/003696, filed 7 Apr. 2004, which claims priority of German Application No. 103 16941.5, filed 12 Apr. 2003. The PCT International Application was published in the German language.

BACKGROUND OF THE INVENTION

The invention relates to a transport or conveying device for transporting articles between locations.

Transport devices of the type referred to here include accumulating roller chains. They have a flat transport element, on which a basic carrier provided with rollers is displaceable. An example of a flat transport element is a rail which, as seen in cross section, is, for example, of rectangular design and extends along the transport path for the transport device. The height of the rail is substantially larger than its thickness, whereby it is designated as a flat transport element. The basic carrier has a basic body provided with at least two rollers which surround the flat transport element at the two side edges running in the transport direction and are arranged such that the basic carrier can be moved forward along the transport element while being reliably held in a predetermined position. The basic carrier has at least one article carrier mounted on it which serves for keeping articles to be conveyed by means of the transport device secure.

It became apparent that, for transporting the basic carriers on the transport element, complicated drive devices are required, which in many instances impede the handling of the articles held by the article carriers.

SUMMARY OF THE INVENTION

The object of the invention is, therefore, to provide a transport device which allows reliable transport of basic carriers, together with the article carriers, on the transport element, without impeding access to the articles held by the article carriers.

To achieve this object, a transport device is proposed wherein the transport element itself is driven and consequently moves in the transport direction. This drives the basic carriers mounted on the transport element along, without need for further drive devices which would be provided along the transport path and would consequently obstruct access to the articles held by the article carriers.

The transport element is preferably of flat design, as described above. As a result of this configuration, a basic carrier can be held in a simple way in a position defined with respect to the transport element. The transport element may also be of a different design. What is critical is that a basic carrier can be held in a defined position.

An exemplary embodiment of the transport device is preferred which is distinguished in that the transport element is driven continuously. This embodiment leads to drive forces being transmitted constantly to the basic carriers. When a basic body mounted on the transport element is stopped in order to make it possible to process the article held by the article carrier, the transport element continues to run and continues to convey other basic carriers. Downstream of the stopped basic carrier, a virtual accumulation occurs which is dispersed without further action as soon as the stopped basic carrier is released again.

An exemplary embodiment of the transport device is particularly preferred which is distinguished in that the transport element is designed as a flexible belt. This embodiment makes it possible particularly easily not only to guide the transport element along a rectilinear conveying zone, but also to implement any desired transport paths. In this case, not only circular paths can be implemented. It is also conceivable, for example, to move the transport element along a triangular conveying zone and in this case also to overcome different heights.

The term "flexible" therefore also means here that the belt can be guided around corners. However, the belt is virtually unstretchable in its longitudinal direction, in order to allow the transmission of drive forces.

In a preferred exemplary embodiment, a fastening capable of being implemented as a dovetail connection is provided between a basic carrier and an article carrier mounted there. This allows a displacement of the article carrier with respect to the basic body and also the exchange of said article carrier. An article carrier can be removed from the dovetail connection and be replaced by a new one which is then conveyed together with the basic carrier along the transport element.

An exemplary embodiment of the transport device is preferred, furthermore, which has a magazine which can receive a number of article carriers. The magazine is oriented with respect to the transport path in such a way that an article carrier can be pushed out of a basic carrier and received by the magazine. A new article carrier can then be pushed out of the magazine or another article carrier into the basic carrier.

An exemplary embodiment of the transport device is preferred, furthermore, which is distinguished in that the basic carrier has a basic body which is designed elastically at least in some regions. In this case, the basic body is preferably designed elastically in such that it can adapt to the transport element when the element is guided via a deflecting roller.

Finally, an exemplary embodiment of the transport device is preferred including at least one actuation device which aids one or more basic carriers to be coupled to the transport element. This means that the basic carriers are held on the transport element such that they are moved forward not only on account of the friction between the rollers of the basic carrier and the transport element, but also by additional holding forces.

BRIEF DESCRIPTION OF THE DRAWINGS

The invention is explained in more detail below with reference to the drawings in which:

FIG. 1 shows a basic diagram of a transport device in a top view;

FIG. 2 shows a cross section through a transport element of the transport device in FIG. 1, along the line II-II in FIG. 1;

FIG. 3 shows a basic diagram of the basic carrier reproduced in FIG. 2, with an article carrier, in a top view;

FIG. 4 shows a basic diagram of a magazine cooperating with a transport device;

FIG. 5 shows a top view of a detail of a transport device according to FIG. 1, and FIG. 6 shows a front view of two basic carriers lying next to one another.

DESCRIPTION OF A PREFERRED EMBODIMENT

The basic diagram according to FIG. 1 shows a top view of a transport device 1 with a transport element 9 which is guided around deflecting rollers 3, 5 and 7 and on which a number of basic carriers 11 with article carriers 13 are provided. The articles 15 held by the article carrier 13 are indicated here by circles.

The transport element 9 is guided along a closed triangular path. The basic carriers 11 lie outside the inner space 14 enclosed by the transport element 9, and thus define a transport path for the basic carriers 11.

The transport element 9 is guided, together with the basic carriers 11, on the outside on the circumferential surface of the deflecting rollers 3, 5 and 7 and is frictionally connected to these. At least one of the deflecting rollers, for example the deflecting roller 5, may be driven, so that, as indicated by an arrow 17, it rotates counterclockwise. As a result, the basic carriers 11, which are arranged on the transport element 9 in the region which lies between the deflecting rollers 5 and 7, move from right to left, this being indicated by a second arrow 19.

In the exemplary embodiment of the transport device 1 indicated here, in that region of the transport element 9 which has just been referred to, a first stopper 21, which is designed to be moveable, is provided in the space 14 enclosed by said transport element. This stopper can consequently be displaced out of a first functional position, in which it does not project into the transport path of the basic carriers 11, into a second functional position, illustrated here, in which it projects into the transport path of the basic bodies 11 and serves as a stop. The first stopper 21 may also be arranged above or below the transport element 9; what is critical is that it can be displaced into the transport path of the basic carriers 11 and can be retracted again.

FIG. 1 indicates that three basic carriers 11 have been stopped by the first stopper 21, so that these are arranged, abutting one another, on the transport element 9 and do not move in the direction of the arrow 19.

As explained in more detail below, the basic carriers 11 are mounted on the transport element 9 via rollers, so that, on the one hand, they are driven on by the moving transport element 9, but, on the other hand, can be stopped by a stationary stopper 21 and come to a standstill. The term "stationary" means, here, that the first stopper 21 does not move in accompaniment with the transport element 9, at least not at the same speed. This serves simply for activating the basic carriers 11. Since the basic carriers 11 are mounted on the transport element 9 by means of rollers, it is possible, even when basic carriers 11 have accumulated at the first stopper 21, to continue to move the transport element 9, in order still to impart a drive force to other basic carriers 11 mounted on the transport element 9 and convey these further along the transport path. Correspondingly, three stationary basic carriers 11 are indicated here at the first stopper 21, which lie directly against one another and are virtually in accumulation, whereas, further along the transport element 9, other basic carriers 11 are arranged at a distance from one another and are moved forward together with the transport element 9.

Preferably, the transport element 9 is driven continuously, so that the basic carriers 11 not stopped are transported, unimpeded, further on uniformly. Moreover, a continuous drive can be implemented relatively cost-effectively. In this case, it is also possible to implement a variable transport speed by means of the drive.

At a distance from the first stopper 21, a second stopper 22 is provided here, the functioning of which corresponds to that of the first stopper. The second stopper 21 is preferably arranged in the inner space 14, but, like the first stopper 21, may also be located above or below the transport element 9. The distance between the two stoppers 21 and 22 is selected such that a predetermined number of basic carriers 11 are accommodated between the two stoppers. The stoppers can preferably be activated separately. As a result, selectively, after the actuation of the first stopper 21, all the accumulated basic carriers 11 can be released again or only that number of basic carriers present between the two stoppers 21 and 22 are released again. If, therefore, the second stopper 22 is activated and displaced into the transport path of the basic carriers 11, then, even after the release of the first stopper 21, not all the accumulated basic carriers 11 can be conveyed further on by the transport element 9, but only those which are present between the two stoppers.

The distance between the two stoppers 21, 22 is freely selectable, so that the number of basic carriers arranged between these can be predetermined correspondingly. It is also conceivable to design the second stopper 22 so as to be displaceable along the transport element 9, so that the number of basic carriers 11 lying between the two stoppers can be varied.

The two stoppers 21 and 22 can serve for implementing, in a predeterminable region of the rotating transport element, a buffer from which a predetermined number of accumulated basic carriers 11 can be released. It is also conceivable, however, to provide one or both stoppers in the region of a processing station, within which a processing of the articles 15 held by the article carriers 13 mounted on the basic carriers 11 takes place.

FIG. 2 shows a section along the line II-II reproduced in FIG. 1. Parts which have already been explained by reference to FIG. 1 are given the same reference numerals, and therefore reference may be made to the description relating to FIG. 1.

FIG. 2 shows part of a transport device 1 with a transport element 9 which, as seen in section, has an elongate cross section and has two side walls 23 and 25 running vertically in this illustration and arranged essentially parallel to one another, and also narrow longitudinal edges 27 and 29 on which engage rollers 31 and 33 via which the basic carrier 11, indicated here as a line, is mounted on the transport element 9.

The longitudinal edges 27, 29 and the rollers 31, 33 can be coordinated with one another in such a way, that is to say have a complementary contour such, that the rollers 31, 33 have a secure hold and do not slip off laterally.

Thus, according to FIG. 1, the transport element 9 is of essentially rectangular design, as seen in cross section. However, the longitudinal edges are not plane. Instead, in the exemplary embodiment according to FIG. 2, these are curved upward or downward, so that they can engage into complementarily designed rollers 31 and 33.

It is possible, correspondingly, to design the longitudinal edges 27 and 29 of the transport element 9 concavely and to cause the rollers 31 and 33 to engage in the longitudinal grooves of the transport element 9 which are produced as a result.

It is critical, therefore, that coupling, for example by means of a positive connection, occurs between the longitudinal edges 27 and 29 of the transport element 9 and the rollers 31 and 33 of the basic carrier, and that the basic carrier 11 is held without further holding elements or even additional rails or the like. The transport element 9 therefore serves preferably as the sole carrier for the basic carriers 11.

The basic carrier 11 has connected to it the article carrier 13 which, here, carries an article 15, for example a basic syringe body or an ampoule 35.

In this exemplary embodiment, the article carrier 13 is of U-shape design, so that an upper first leg 37 running essentially horizontally and, at a distance from this, a lower second leg 39 running essentially parallel are provided. The two legs are connected to one another by means of an element 41 running perpendicularly thereto.

Between the article carrier 13 and the basic carrier 11 is provided a fastening which is implemented here as a dovetail connection 43 and consequently allows a displaceability of the article carrier 13 with respect to the basic carrier 11, here upward and downward. It is suitably ensured, preferably by means of a latching connection which, for example, may have a spring-loaded ball, that the article carrier 13 is held in a desired position in an interlock with respect to the basic carrier 1. The specified displaceability of the article carrier 13 with respect to the basic carrier 11 is critical here. Instead of the dovetail connection 43, other fastenings or connections allowing this displaceability may also be used.

FIG. 3 shows the basic carrier 11 and article carrier 13 of FIG. 2 in a top view, identical parts being given the same reference numerals in this illustration, but with the transport element 9 being omitted.

The roller 31 mounted rotatably on the basic carrier 11 and the first leg 37 of the article carrier 13 can be seen clearly. Finally, the fastening, designed as a dovetail connection 43, of the article carrier 13 for holding the latter on the basic carrier 11 is also indicated.

The top view according to FIG. 3 reveals that the article carrier 13 is virtually designed as a clip here and comprises at least one preferably flexibly resilient holding arm 45 and/or 47 engaging around and securely holding the article 15 or ampoule. The type of design of the article carrier 13 is freely selectable. However, it has proved particularly appropriate to have a clip, in which articles to be conveyed can easily be inserted and exchanged.

It can be seen from the illustration according to FIG. 3 of the fastening designed as a dovetail connection 43 that it is possible to displace the article carrier 13 vertically out of the image plane of FIG. 3 and into the latter, but that drive forces, which in FIG. 3 act in the horizontal direction from left to right, or vice versa, on the dovetail connection 43, do not cause any displacement of the article carrier 13 with respect to the basic carrier 11. This ensures that the article carriers 13 can be conveyed, even without additional securing, along the run of the transport element 9, but that an exchange of the article carriers 13 is readily possible, in that forces acting parallel to the side walls 23 and 25 of the transport element 9 are exerted on the article carrier 13, so that the latter is displaced with respect to the basic carrier 11.

FIG. 4 shows a detail of the transport device 1 with a magazine 49. Identical parts are given the same reference numerals, and therefore reference is made to that extent to the description relating to the preceding figures, in order to avoid repetition.

FIG. 4 shows a portion of the transport element 9 with an article carrier 13, merely indicated. Located at a distance above the transport element 9 is a magazine 49 which, here, has a cylindrically designed basic body 51 which is mounted rotatably in a suitable way, this being indicated by an arrow 53. On the circumferential surface 55 of the basic body 51, fastening elements 57, 57' are provided, which correspond to those provided on the basic carrier 11. A dovetail connection is also implemented here, and it is therefore possible to displace the article carrier 13 vertically upward and bring it here into engagement with the fastening element 57 which is arranged in alignment with the dovetail connection of the basic carrier 11.

The fastening elements 57, 57' are designed, as seen in a vertical direction, with a length such that a plurality of article carriers 13 can be pushed one above the other onto a fastening element 57, 57'. Article carriers 13 can thus be pushed in succession from a plurality of basic carriers 11 onto the fastening elements 57, 57'.

After a rotation of the basic body 51 of the magazine 49, article carriers 13 present there can be displaced downward, so that these are received by basic carriers 11 lying below the magazine 49. A simple exchange of article carriers 13 and consequently also a format change, as it is known, thereby become possible.

FIG. 4 indicates by way of example, on the right side of the basic body 51, a plurality of article carriers 13 which lie one above the other and are pushed onto the fastening element 57'.

FIG. 5 again shows in a top view, that is to say similar to FIG. 3, a number of basic carriers 11 and article carriers 13 fastened to them. These each hold a cylindrical article 15. All the basic carriers are mounted via rollers on a transport element, not illustrated here, which runs in an arc. In the illustration according to FIG. 5, a plurality of basic carriers abutting one another are illustrated. These are therefore virtually in accumulation.

One of the basic carriers 11 is explained in more detail here by way of example. In the exemplary embodiment illustrated here, contrary to that shown in FIG. 3, the basic carrier 11 is designed to be wider than the article carrier 13. Here, too, the upper first leg 37 of the article carrier 13, which again is designed as a clip, can be seen in the top view, the holding arms 45 and 47 not being designed symmetrically here. The first holding arm 47 is longer than the opposite second holding arm 45 and therefore serves as a spring arm for fixing the article 15.

It can be seen, here, that the fastening between basic carrier 11 and article carrier 13 is again designed, for example, as a dovetail connection 43, and therefore a displacement of the article carrier 13 with respect to the basic carrier 11 in the transport direction or in the opposite direction to this is not possible. However, the article carrier 13 can be displaced with respect to the basic carrier 11 perpendicularly to the image plane in FIG. 5.

The basic carrier 11 illustrated here has, on its top side facing the observer, two rollers 31*a* and 31*b* which are arranged at a distance from one another and are designed in such a way that they hold the basic carrier 11 securely on the carrying element 9. As already indicated in FIGS. 2 and 3, it is possible, here, to design the rollers in such a way that they engage around the longitudinal edges 27 and 29 of the transport element 9, in which case the longitudinal edges may have a narrowing tapering conically outward, that is to say a virtually prismatic shape, so that the rollers have a better hold and are automatically centered and held in an interlock on the transport element 9, that is to say cannot slip off laterally. The positive coupling between the longitudinal edges 27 and 29 and the rollers 31*a* and 31*b* may also be implemented otherwise. For example, the rollers could also engage into U-shaped depressions in the longitudinal edges.

FIG. 5 reveals that the rollers 31*a* and 31*b* are mounted on fastening arms 59*a* and 59*b* of the basic carrier 11 which, when a curve is negotiated, are bent or pivoted with respect to the basic body 61 of the basic carrier 11, so that the rollers 31*a* and 31*b* can follow the run of the transport element 9, not illustrated here, which is bent in a radius: the fastening arms 59*a* and 59*b* are connected to the basic body 61 via bending zones 63*a*, 63*b* which are distinguished by a reduced thickness and consequently have some elasticity.

FIG. 6 shows a front view of two basic carriers 11 lying next to one another, only the right basic carrier carrying an article carrier 13.

It becomes clear from the top view of the basic carrier 11 that the fastening arms 59a and 59b carry on top two rollers 31a and 31b. As is evident from FIG. 5, the bending zones 63a and 63b are implemented here by grooves 66a, 66b running vertically at a distance from the axis of symmetry 65 of the basic carrier 11, thus resulting in regions of reduced material thickness, so that the rollers 31a and 31b are mounted elastically pivotably with respect to the basic body 61 of the basic carrier 11. In order to allow the pivotability of the fastening arms 59a and 59b, horizontal slots 67a and 67b are also provided, which are introduced into the basic body 61 of the basic carrier 11 on the outside from right and left and which terminate at a distance from the center axis 65 and intersect the bending zones 63a and 63b. The fastening arms 59a and 59b are thereby designed moveably with respect to the basic body 61.

In the exemplary embodiment according to FIG. 6, the basic carriers 11 are provided with three rollers, at the top with the two rollers 31a and 31b and at the bottom with a roller 63 mounted here in the region of the center axis 65. Such a design leads in a simple way to a particularly exact orientation of the basic carrier 11 with respect to the transport element 9.

The lower roller 63, too, is mounted on a flexible fastening arm 59c which is pivotable with respect to the basic body 61, in that, above the roller 33, a horizontally running slot 67c is provided, which is introduced into the basic body 61 from outside over and beyond the center axis 65.

The basic carrier 11 lying on the right of the basic carrier 11 described is provided with an article carrier 13 into which an article, for example an ampoule 15, is snapped.

In the transport device 1 described here, the transport element 9 may be designed as a single elastic metal band, but a single belt made from plastic or from a composite material is preferably selected, which, as seen in the transport direction, preferably has low elasticity, so that forces introduced into the belt, that is to say into the transport element, by a drive can be transmitted reliably, even over long distances, consequently ensuring a drive of the basic carriers 11 which are mounted on the transport element 9 or the belt.

A belt, as compared with a metal band, has the advantage that it is usually more flexible, so that a smaller radius of curvature can be implemented in a curved region. Furthermore, when a belt is used, it is more readily possible for height differences to be overcome, that is to say for the basic carriers carried by the transport element 9 to be conveyed at levels which are arranged at a distance from one another.

In the implementation of a transport device 1, as described above, a number of basic carriers 11 can be driven and transported by means of a transport element 9. It is consequently possible to supply article carriers 13 and articles 15 held by these to various processing stations and to process the articles 15 while these remain mounted together with the basic carrier 11 on the transport element 9. For this purpose, as explained with reference to FIG. 1, at least one stopper is provided, which projects into the transport path of the basic carriers 11 or article carriers 13 and stops these. Subsequent basic carriers 11 are consequently accumulated. Since the basic carriers 11 can be oriented exactly on the transport element 9, it is possible to process accurately the articles 15 delivered by the basic carriers 11.

It is possible by means of suitable sensors to establish whether a basic carrier 11 has run up at a stopper and whether the processing of an article 15 can therefore take place.

Via a magazine 49, article carriers 13 can be removed from a basic carrier and replaced by others during the running transport situation, that is to say without the transport element 9 being stopped. At least one stopper is preferably arranged in the region of a magazine 49, so that the article carriers 13 can be stopped opposite the latter and oriented and exchanged. Processed articles 15 can therefore be removed together with the article carrier 13 and be replaced by unprocessed articles. It is also possible, in this case, to introduce articles of different size into the continuous processing.

Finally, it is not in this case absolutely necessary to use magazines 49 having a cylindrical basic body 51. Individual fastening elements 57 may also be moved up to the transport element 9, in order to move article carriers 13 out of the transport path or introduce new ones.

The following must be noted as regards the functioning of the transport device explained with reference to the figures:

The transport device 1 serves for transporting articles 15 simply and cost-effectively and at the same time for selecting conveying paths which need not lie at only one level.

The drive force is ensured by a transport element 9, on which basic carriers 11 mounted by means of rollers are mounted displacably. On the one hand, this ensures that sufficient drive forces are transmitted to the basic carriers 1. On the other hand, it is possible to stop and accumulate the basic carriers by means of a stopper 21, without the further transport of other basic carriers not obstructed by the stopper 21 being impaired.

The basic carriers 11 may be transported along a closed path which is freely selectable within broad dimensions. For example, a triangular path, illustrated in FIG. 1, can be implemented, in that the transport element 9 is moved along a closed path around deflecting rollers 3, 5 and 7. The basic carriers 11 are usually located outside the space 14 enclosed by the transport element 9.

Along the path of movement of the basic carriers 11, one or more processing stations may be provided, within which the articles 15 held by the basic carrier 11 or by the article carrier 13 fastened to the latter are processed. Processing may involve providing the articles 15 held by the article carrier 13 with additional elements, that is to say producing a finished product, or cleaning corresponding articles 15, filling them with substances and closing them or the like.

In order to allow defined processing, the articles 15 arranged on a basic carrier 11 by means of an article carrier 13 are stopped, in that at least one stopper, here a first stopper 21, is brought into the path of movement of the basic carriers 11, so that a basic carrier 11 is stopped and subsequent basic carriers 11 are accumulated.

An accumulation of basic carriers 11 may also take place on free zones, that is to say outside processing stations, in order to make available a number of basic carriers 11 in a buffer.

Sensors may be provided in the processing stations in order to detect the individual positions of the basic carriers 11 and the articles 15 held by the associated article carriers 13 and in order to ensure exact positioning. It is also possible to detect whether a basic carrier 11 is at a stopper and is present in a processing station or a buffer at all.

By the article carriers 13 being fastened to the basic carrier 11 in the way selected here, it is possible to exchange ready-processed articles 15. These can be introduced into a magazine 49 and be made available for further processing or the like. Articles 15 to be processed can be introduced from the same magazine or another magazine into the transport path and made available.

This exchangeability of the articles 15 also makes it possible to make available articles of different size and type universally to different processing stations.

FIG. 1 reveals that all the basic carriers 11 are arranged on the outside of the transport element 9, said outside facing away from the enclosed space 14. On curves, therefore, the basic carriers 11 lie on the outside on the deflecting rollers 3, 5 and 7. During counterclockwise movement, as indicated by the arrow 17, the transport element 9 can therefore execute only leftward curves, as seen in the transport direction.

Should it be necessary to negotiate a curve in the opposite direction, the transport element 9 can be offset, that is to say, during the transport movement, rotated through 180° about an axis pointing in the transport direction, in such a way that the basic carriers 11 are arranged virtually on the opposite side of the transport path. After such an offset of the transport element 9, a curve is possible in the opposite direction, that is to say, here, to the right.

In the type of drive predetermined here, in which the transport element 9 is driven and drives the basic carriers 11, only relatively small height differences can be overcome as a function of the friction of the rollers 31, 33, because the basic carriers 11 otherwise roll back opposite to the transport direction on the transport element 9.

When height differences have to be overcome, that is to say when basic carriers 11 are to be transported onto a higher level, the free moveability between the basic carrier 11 and the transport element 9 must be reduced or canceled completely, in order virtually to couple the basic carriers 11 to the transport element 9.

Where relatively slight gradients or height changes are concerned, it is possible to increase the frictional forces afforded between basic carrier 11 and transport element 9 in that the transport element 9 follows virtually a helix and is offset somewhat. It is also possible, however, to provide on the article carrier 13 or preferably on the basic carrier 11 a clamping device which, if required, ensures coupling between basic carrier 11 and transport element 9, so that height differences can be overcome, without the basic carriers 11 rolling back opposite to the transport direction on the transport element 9.

It is conceivable, for example, to provide the basic carrier 11 or article carrier 13 with a, for example, pivotable lever which is pivotable via a control element lying in the vicinity of the basic body or of the transport element and which engages into the transport element 9 in such a way that the associated basic carrier 11 is coupled to the transport element 9 and runs synchronously together with the latter, even when a gradient is being overcome. The control element may be, for example, a rail which runs along the transport path and which acts on the lever and, for example, pivots the latter.

The frictional forces between transport element 9 and basic carrier 11 may also be increased in that the basic carrier 11 is pressed against the transport element 9 and is thus coupled to the latter by virtue of higher frictional forces.

Such coupling in order to overcome an ascending gradient can also be used when the transport element 9 is guided from a higher level to a lower level. In this case, the basic carriers 11 are prevented from rolling downward along the transport element 9 in an uncontrolled manner and from possibly being damaged.

When such devices are used for coupling the basic carrier 11 and transport element 9 and/or when an offset run of the transport element 9 is implemented, even height differences vertically upward and downward can be overcome.

Due to the use of two stoppers lying one behind the other, as seen in the conveying direction of the transport element 9, the distance between two successive basic carriers 11 can be set. First, the first stopper 21 is activated, in order to stop one or more basic carriers. A second stopper 22 is arranged at a distance behind the first stopper 21 such that, when this second stopper 22 is actuated, in the event of an accumulation of basic carriers the second basic carrier 11 lying behind the first stopper is stopped. The first stopper 21 can then be deactivated in order to release the basic carrier 11 lying directly behind the latter. This basic carrier is then moved further on at the speed of the transport element 9. After a predetermined time segment, the second stopper 22 is released, so that the basic carrier 11 stopped here can then be driven by the transport element 9. By the release of the second stopper 22 being coordinated as a function of the transport speed of the transport element 9, and, if appropriate, by taking into account a starting delay of a stopped basic carrier 11, the distance between two successive basic carriers can be set. The number of stoppers may also be increased in order to improve the possibilities for influencing the accumulated basic carriers 11.

By the distance between the two stoppers 21, 22 being varied, in each case a group of basic carriers 11 can also be released. Thus, in each case, a predeterminable number of basic carriers 11 and of associated article carriers 13 can be supplied to a processing station and in each case processed in one cycle.

The number of articles 15 supplied to one processing station may also be varied in that a basic carrier 11 has arranged on it a different number of article carriers 13 or different article carriers which can receive a different number of articles 15.

The transport speed of the basic carriers 11 and of the associated articles 15 can to some extent be selected independently of the transport speed of the transport element 9. For example, upstream of a processing station, the article carriers 13 can be transferred into an additional transport element arranged parallel to the transport element 9. The transfer from one transport element to the other becomes possible in that, on account of the dovetail connection 13, article carriers 13 can be displaced with respect to a basic carrier 11 perpendicularly to the transport direction along the axial length of the dovetail and consequently can be transferred onto a basic carrier which is arranged on an additional transport element running parallel to the transport element 9 and which is led further on at a different transport speed. To make it easier to transfer the basic carriers from one transport element onto another, one or more stoppers may be used.

It is also possible, however, to arrange near the transport element 9 a worm device having a rotating cylinder, on the outer surface of which a helical groove is provided. The center axis of the cylinder is arranged essentially parallel to the run of the transport element 9. Basic carriers 11 or article carriers 13 delivered on the transport element 9 can engage by means of a suitable nose into the helical groove and are then moved further on in the conveying direction at the speed predetermined by the worm conveyor. It is possible, in this case, to apply a higher or else a lower conveying speed, subsequent basic carriers 11 being accumulated. A worm device of this type may, if required, also be combined with one or more stoppers. The worm device may also have projections which are arranged on an imaginary helix and which project into the transport path of the basic carriers and grasp these. The basic bodies can consequently be conveyed at a speed which differs from that of the transport element 9.

In the region of a processing station, article carriers 13 can also be separated from the basic carrier 11 and exchanged, particularly when, in the region of such a processing station, to be designated as a changing station, a transport speed adapted to a change is predetermined, and/or stoppers are provided which can make it easier to change the article carriers 13.

It is particularly advantageous that, in the transport device 1 described here, the transport element 9 is driven and is preferably designed as a belt. The transport paths can thereby be selected freely within a very broad framework. Even narrow curves can be implemented. Moreover, even height differences can be bridged on account of the measures described above, with the aid of which basic carriers 11 carried along by the transport element 9 can be coupled to the transport element, so that they do not roll back on an ascending gradient or do not accelerate on a descending gradient and possibly suffer damage.

Since there are no disturbing drive devices along the entire run of the transport element and of the basic carriers 11 carried with it, the transport device 1 can have a highly compact construction. Moreover, it is possible to arrange buffers and processing stations freely within a broad framework, precisely because any drive devices to not have to be taken into account. Drive forces can be introduced virtually at any deflection of the transport element 9 by means of a roller.

Finally, closed transport paths can also be implemented with different deflection directions, to be precise when the transport element 9 is offset and consequently rotated through 180°. The offsetting of the transport element 9 may be implemented in that deflecting rollers via which the transport element 9 is guided are used. The axis of rotation of a plurality of successive deflecting rollers is inclined to an increasing extent until a 180°offset of the transport element 9 is achieved. Some or even all of the deflecting rollers may, of course, be driven here.

Overall, it becomes clear that a universal transport system can be implemented by means of the transport device 1 described here.

The invention claimed is:

1. A transport device comprising:
    a flat transport element including a single belt and a drive operable to move the single belt along a length direction thereof;
    at least one basic carrier including rollers securely mounting the basic carrier in a predetermined position on the single belt, the basic carrier and the rollers thereof being mounted solely on the single belt and moving together with the belt; and
    at least one article carrier mounted on the basic carrier.

2. The transport device as claimed in claim 1, wherein the drive is driven continuously.

3. The transport device as claimed in claim 1, wherein the single belt is a flexible, bendable belt.

4. The transport device as claimed in claim 3, wherein the basic carrier includes bent zones along which the rollers roll.

5. The transport device as claimed in claim 1, wherein the at least one article carrier comprises a clip for clipping to an article.

6. The transport device as claimed in claim 1, wherein the article carrier is supported displaceably with respect to the basic carrier.

7. The transport device as claimed in claim 6, further comprising a fastening between the basic carrier and the article carrier.

8. The transport device as claimed in claim 7, wherein the fastening comprises a dovetail connection having a longitudinal direction across a path of drive of the single belt, the fastening enabling displacement of the article carrier along the longitudinal direction of the dovetail connection.

9. The transport device as claimed in claim 1, wherein the basic carrier comprises a magazine which receives a plurality of the article carriers.

10. The transport device as claimed in claim 9, wherein the magazine includes fastening elements thereon for article carriers.

11. The transport device as claimed in claim 10, wherein the magazine has a basic body of essentially cylindrical construction.

12. The transport device as claimed in claim 1, wherein the basic carrier comprises a basic body and at least two of the rollers that engage and roll on the single belt the basic body being positioned over the single belt and between the at least two of the rollers.

13. The transport device as claimed in claim 1, wherein the transport element is capable of being offset.

14. The transport device as claimed in claim 1, further comprising a clamping device operable for coupling the basic carrier to the single belt.

15. The transport device as claimed in claim 1, further comprising a pressing device, which presses the basic carrier against the single belt.

16. The transport device as claimed in claim 1, wherein the single belt has opposite lateral sides and is substantially flat and thin between the opposite lateral sides thereof.

17. The transport device as claimed in claim 16, wherein the single belt has a top side and a bottom side, the rollers engaging the top and the bottom sides.

18. The transport device as claimed in claim 1, further comprising at least one stop selectively movable across a moving direction of the single belt into a blocking position to block the at least one basic carrier from moving with the single belt, the at least one stop being further selectively movable into an unblocking position to allow the at least one basic carrier to move with the single belt.

19. The transport device as claimed in claim 18, further comprising a plurality of the basic carriers, each basic carrier having a respective article carrier mounted thereon, and the stop being placed and operable to block movement of one of the basic carriers while permitting movement of another of the basic carriers with the single belt.

20. The transport device of claim 18, wherein the rollers of the basic carrier are operable to permit the single belt to move when the basic carrier is blocked by the stop, and the rollers are operable to enable movement of the basic carrier by the single belt past the stop in the unblocking position.

* * * * *